Aug. 24, 1943.  D. CREW  2,327,623
GYROSCOPIC DIRECTION INDICATOR AND LIKE INSTRUMENT
Filed April 24, 1942
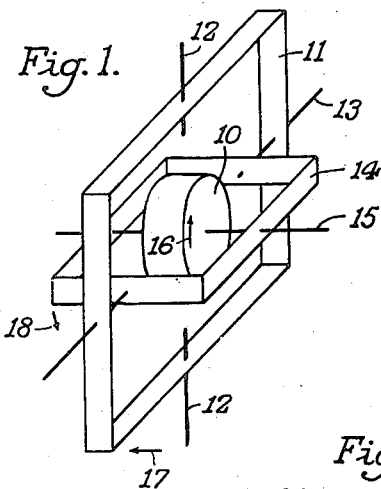
Fig. 1.
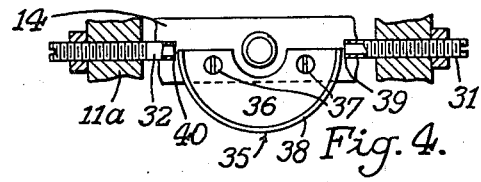
Fig. 4.
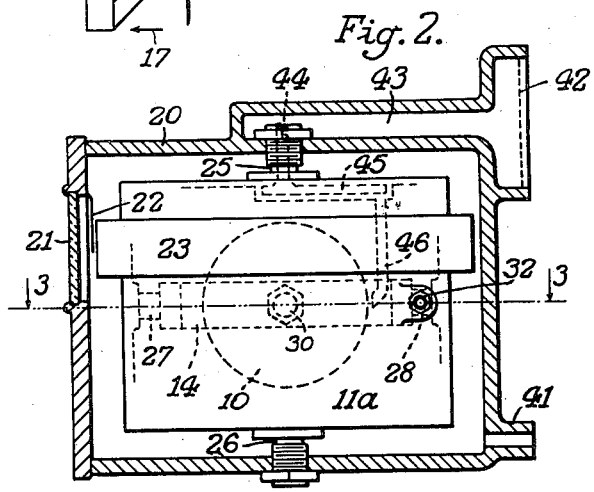
Fig. 2.
Fig. 5.
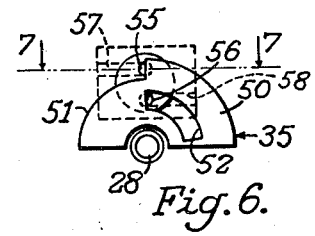
Fig. 6.
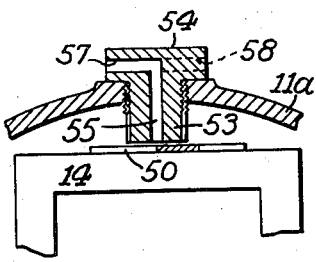
Fig. 7.
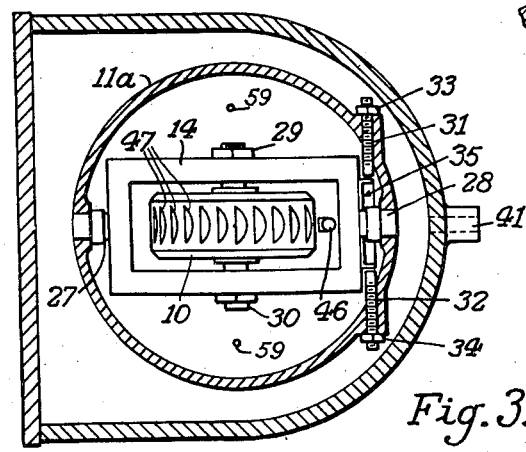
Fig. 3.
Inventor:-
David Crew
By Stevens & Davis
Attys.

Patented Aug. 24, 1943

2,327,623

UNITED STATES PATENT OFFICE 2,327,623

GYROSCOPIC DIRECTION INDICATOR AND LIKE INSTRUMENT

David Crew, New Malden, England, assignor to Reid & Sigrist Limited, New Malden, England Application April 24, 1942, Serial No. 440,360
In Great Britain April 4, 1941

9 Claims. (Cl. 74—5)

This invention relates to gyroscopic direction indicators and like instruments, such, for instance, as artificial horizons.

With such instruments trouble is sometimes experienced due to the plane of rotation of the gyro-rotor becoming sufficiently displaced from its normal orientation for the instrument to lose substantially all of its directional properties, the result being that the usual indicating dial or equivalent means becomes substantially free and the instrument is rendered useless until the plane of rotation of the gyro-rotor is re-set, usually by a manually operated caging device.

It is the object of the present invention to provide improvements with a view to overcoming this defect. It is a further object of the invention to provide an efficient and responsive stabilizing means for gyroscopic direction indicators, automatic pilots and like instruments.

In a gyroscopic instrument having a gyro-rotor mounted upon inner and outer gimbals for permitting the rotor three degrees of freedom, according to the invention an improved method of automatically urging the inner gimbal and the gyro-rotor to a predetermined position with respect to the outer gimbal consists in applying a couple to the pivots by which the inner gimbal is carried, which couple tends to move the inner gimbal angularly in a plane inclined to the predetermined plane of revolution of the gyro-rotor, and thereby causes the gyro-rotor, together with the inner gimbal, to precess towards the said predetermined position, the couple being removed when the gyro-rotor reaches the said predetermined position.

This improved method is more particularly applicable to a gyroscopic instrument having an outer gimbal mounted to rotate about a substantially vertical axis, and carrying an inner gimbal, which latter is pivoted to the outer gimbal about a substantially horizontal axis, and which carries a gyro-rotor having its axis of revolution substantially at right angles to the pivotal mounting of the inner gimbal.

According to a further aspect of the invention there is provided a gyroscopic instrument having a gyro-rotor which is mounted by means of inner and outer gimbals so as to have three degrees of freedom, characterised by the fact that the position of the inner gimbal relative to the outer gimbal controls a device which imparts a couple to the outer gimbal, said couple causing the gyro-rotor to execute a precessional movement, and thus bring the inner gimbal to a predetermined position in which the said couple is removed.

Further there is provided according to the invention a gyroscopic instrument comprising an outer gimbal mounted pivotally about a first axis, an inner gimbal pivotally carried by the outer gimbal about a second axis disposed at right angles to the first, and a gyro-rotor mounted in said inner gimbal about a third axis at right angles to the second, a plurality of jet nozzles directed substantially tangentially with respect to the outer gimbal, so that jets therefrom act or react upon the outer gimbal to apply a couple thereto about the first axis, and selective valve means adapted to control the flow of fluid through the jet nozzles, said valve means being controlled by movement of the inner gimbal relative to the outer gimbal, and being arranged to bring the inner gimbal to a predetermined position relative to the outer gimbal owing to the precession of the gyro-rotor brought about by the said couple imparted to the outer gimbal.

The invention is illustrated by way of example in the accompanying diagrammatic drawing, in which:

Figure 1 is an explanatory perspective view of a gyro-rotor mounted so as to have three degrees of freedom;

Figure 2 is a sectional side elevation of a direction indicator suitable for air or other craft;

Figure 3 is a sectional plan taken on the line 3—3 of Figure 2;

Figure 4 is a fragmentary elevation of the improved stabilizing means drawn to an enlarged scale, the inner gimbal being disposed in its predetermined position;

Figure 5 is a view similar to Figure 4 but showing the inner gimbal displaced;

Figure 6 is a fragmentary elevation of a modified form of stabilising devices; and Figure 7 is a fragmentary sectional plan taken on the line 7—7 of Figure 6.

In Figure 1 is shown a gimbal arrangement supporting a gyro-rotor 10 so that the latter has three degrees of freedom. For this purpose an outer gimbal 11 in the form of a frame is pivoted about a vertical axis 12 to any fixed support (not shown) such as the casing of an instrument. The outer gimbal 11 carries pivotally about an axis 13 an inner gimbal 14, which is also in the form of a substantially rectangular frame but is normally disposed horizontally as shown. The gyro-rotor 10 is mounted within the inner gimbal 14 so as to be free to rotate about an axis 15. It will be noted that the axis 12 (which is herein referred to as the first axis) is disposed at right angles to the axis 13 (herein referred to as the second axis), while the axis 15 (which is herein referred to as the third axis) is always at right angles to the second axis 13. It will thus be seen that the gyro-rotor 10 is free to move angularly about any one or more of the three axes 12, 13 and 15. Moreover when the gyro-rotor is spinning upon the axis 15 its gyroscopic action tends to maintain the plane of revolution of said gyro rotor in a constant position, so that a gyro-rotor arranged in the manner shown in Figure 1 would be applicable to a direction indicator or like instrument intended to show changes in the angular position in azimuth of an aircraft or the like.

With instruments of this kind, which, of course, are already well known, difficulty is sometimes caused by the fact that in course of time the plane of revolution of the gyro-rotor 10 becomes inclined to the vertical, and in due course it approaches a substantially horizontal position. In this state the instrument loses its directional properties and the outer gimbal 11 merely rotates idly about the first axis 12. The inner gimbal 14 and the gyro-rotor 10 then have to be restored to their initial positions, as shown in Figure 1, by a manually operated caging device (not shown) which restores the sensitivity of the instrument, although, of course, the latter will then require resetting to the desired course by comparison with a magnetic compass or the like.

The invention sets out to avoid this difficulty by providing automatic means which tend to maintain the plane of revolution of the gyro-rotor coincident with the first axis 12, i. e. tend to keep said plane in a vertical position so long as the first axis 12 is vertical. This effect is obtained by using the phenomenon of precession, which of course is quite well-known in connection with gyroscopes. With the parts disposed in the positions shown in Figure 1 and the gyro-rotor 10 turning in the direction of the arrow 16, i. e. clockwise as viewed from the right, a turning force or couple applied to the outer gimbal 11 in the direction of the arrow 17 causes the gyro-rotor 10 to tilt the inner gimbal 14 violently in the direction of the arrow 18, such tilting taking place about the second axis 13. This principle is utilised in the present invention by causing the inclination of the inner gimbal 14 to control a device which will hereinafter be described and which applies to the outer gimbal 11 a turning force or couple such, for example, as that shown by the arrow 17 so as to restore the gyro-rotor 10 to its original vertical position, said turning force or couple then being automatically removed so that the gyro-rotor remains in this position.

A constructional embodiment of the invention is shown in Figures 2 to 5, which represent a pneumatically driven gyroscopic direction indicator of the form used on aircraft and the like. An outer casing 20 is secured to the instrument board or other suitable part of the aircraft or equivalent and has a window 21 with an index line or pointer 22 adapted to be viewed with reference to an endless calibrated scale 23 marked off in angular degrees. The scale 23 is carried by a closed cylindrical drum 11a, which is mounted in bearings 25 and 26 so as to be freely rotatable about its major axis, which is arranged vertically (assuming that the aircraft or equivalent is in a substantially level position). It will be seen that the drum 11a corresponds with the outer gimbal frame 11 in Figure 1 and that the bearings 25 and 26 are disposed upon the first axis 12.

An inner gimbal frame 14 is mounted in a horizontal position within the drum 11a and is freely movable upon bearings 27 and 28 corresponding to the second axis 13 in Figure 1. The gyro-rotor 10 is in turn mounted upon bearings 29 and 30 at opposite sides of the inner gimbal 14, these bearings corresponding with the third axis 15 in Figure 1. Caging means (not shown) of any known form would normally be included for the purpose of manually moving the inner gimbal 14 to the horizontal position shown in Figures 1, 2 and 3, the plane of revolution of the gyro-rotor 10 then being vertical. Such caging means usually incorporate a device to rotate the drum 11a so that the reading, which is seen through the window 21, corresponds with the known direction of the aircraft or equivalent.

For the purpose of stabilising the gyro rotor 10 in the manner described above the drum 11a is fitted with a pair of coaxially disposed and substantially tangential tubular jet nozzles 31 and 32, which are screw-threaded as shown and provided with lock nuts 33 and 34 so as to be capable of adjustment towards and away from a shield member 35 which is secured to the adjacent part of the inner gimbal 14. The construction of the jet nozzles and the shield member will be seen more clearly in Figure 4; the shield member comprises a substantially semi-circular plate 36 secured to the gimbal frame 14 by screws 37, and has around the curved part of its periphery a flange 38 which is adapted to move in close proximity to the inner end portions 39 and 40 of the jet nozzles 31 and 32. When the inner gimbal frame 14 is horizontal, as shown in Figure 4, both of the end portions 39 and 40 are partially closed, but when the gimbal frame 14 tilts, say to the position shown in Figure 5, the inner end 40 of the jet nozzle 32 becomes very nearly closed, while the inner end 39 of the jet nozzle 31 is completely opened.

In order to drive the gyro-rotor 10 air is evacuated from the outer casing 20 through a pipe connection 41 by means of any suitable device, such, for example, as a vacuum pump or a Venturi tube. As a consequence a stream of air from the atmosphere flows through a filter 42 along a passage 43 and by way of a duct 44 extending through the bearing 25 into a passage 45 which is formed in the top of the drum 11a and leads to an impeller nozzle 46. The air issues from the impeller nozzle 46 in the form of a jet, which impinges against buckets 47 cut in the periphery of the gyro-rotor 10. The air jet from the nozzle 46 thus keeps the gyro-rotor 10 rotating about its axis, and as said jet strikes the rotor periphery at a position substantially in line with the bearings 27 and 28 the efficiency of the jet is substantially unaffected when the inner gimbal 14 becomes tilted. The air from the impeller nozzle 46, after impinging upon the gyro rotor 10, escapes from the drum 11a through one or other, or both, of the jet nozzles 31 and 32, this depending, of course, upon the position of the inner gimbal 14 and the shield member 35. It will be appreciated that as the air flows through either of the nozzles 31 or 32 it enters the outer casing 20 in the form of a jet, and thus imparts to the nozzle a reactive force which tends to turn the drum 11a about its vertical axis, this of course being due primarily to the tangential disposition of the nozzles 31 and 32. Thus when the inner gimbal 14 is horizontal, as shown in Figure 4, the shield member 35 distributes the air current substantially equally between the nozzles 31 and 32, and the resulting reactive forces which act upon the drum 11a neutralise one another. On the other hand when the inner gimbal 14 becomes tilted, for example in the direction shown in Figure 5, the greater part of the air flows through the jet nozzle 31 and thus imparts to the drum 11a a reactive force in the direction of the arrow 48. This, of course, tends to turn the drum 11a in the same direction as the force which is indicated by the arrow 17 in Figure 1 and produces precession of the gyro-rotor 10, which turns the inner gimbal 14 until it resumes its level position. At this point, of course, the parts reach the position shown in Figure 4 and the reactive force upon the drum 11a becomes zero. In a similar way when the inner gimbal 14 becomes tilted in the opposite direction the jet nozzle 32 comes into operation, thus producing an opposite reactive force causing precession to move the inner gimbal 14 again towards its level position. The sensitivity of the stabilising device and the adjustment of the predetermined position towards which the gyro rotor tends to move can both be regulated by moving the jet nozzles 31 and 32 with respect to the shield member 35. As it is usually unnecessary for all the air which issues from the impeller nozzle 46 to pass through the stabilising means one or more bypass openings, indicated at 59, are provided in the bottom of the drum 11a.

It will be understood that in direction indicators and like instruments the bearings 27 and 28 by which the inner gimbal 14 is mounted upon the outer gimbal 11 are purposely made as frictionless as possible, so that the actual angular movement of the outer gimbal 11 which is necessary to bring about a substantial movement of the inner gimbal 14 is infinitesimal and has no appreciable effect upon the angular reading of the instrument.

A modified form of stabilising device is shown in Figures 6 and 7 and is applicable to the direction indicator shown in Figures 2 and 3. The shield member 35 in this case comprises a plate 50, which is semi-circular in general form but is cut away at 51 for substantially half its circumference and has an arcuate slot 52 corresponding to substantially the remainder of its circumference. This plate 50 is attached to the end of the inner gimbal 14 so as to move angularly with the latter, said plate passing close to the inner end of a nozzle member 53 having a head portion 54 disposed outside the drum 11a. The nozzle member 53 has a pair of longitudinal passages 55 and 56 disposed one above the other and leading into passages 57 and 58 respectively in the head portion 54; these passages are directed tangentially with respect to the drum 11a and point in opposite directions. It will be seen from Figure 6 that when the inner gimbal 14 is level the plate 50 partially covers the inner ends of both of the passages 55 and 56, so that substantially equal quantities of air escape through both of these passages and no effective reactive force is exerted upon the drum 11a. When, however, the inner gimbal 14 tilts in an anti-clockwise direction, as viewed in Figure 6, the plate 50 considerably restricts the upper passage 55, whereas the slot 52 comes into register with the passage 56, thus completely opening the latter; as a consequence the greater part of the air flows through the passage 56 and out of the passage 58, thus creating a reactive force or couple tending to turn the drum 11a in an anti-clockwise direction, as viewed in Figure 7. Conversely when the inner gimbal 14 tilts in a clockwise direction, as viewed in Figure 6, the passage 56 is closed and the passage 55 becomes open on account of the cut away portion 51 of the plate 50.

It will be understood that the constructions described above are given merely by way of example and that various modifications are possible. For instance, it may be desirable in some cases for the plane of rotation of the gyro-rotor to be brought automatically to a position which is inclined at any desired angle with respect to the mounting of the outer gimbal, and this can, of course, be easily effected by varying the position of the shield member 35 with respect to the inner gimbal. Moreover the couple which is applied to the outer gimbal for the purpose of producing precession of the gyro-rotor may be produced in various ways; for instance, the shield member 35 or an equivalent device coupled to the inner gimbal may control the supply of air to a pair of nozzles, the jets from which impinge against the outer surface of the outer gimbal 11 or equivalent, the distribution of air to the jets determining the direction of the force exerted upon the outer gimbal. Alternatively the effect may be produced by electro-magnetic means, a switch or like device controlled by the position of the inner gimbal being adapted to create a force which acts upon the outer gimbal in the appropriate direction to produce the desired stabilising effect.

What I claim is:

1. A gyroscopic instrument comprising, a housing functioning as an outer gimbal, means supporting said outer gimbal for pivotal movement about a first axis, an inner gimbal pivotally carried by the outer gimbal about a second axis disposed at right angles to the first, said inner gimbal being located within said housing, a gyro-rotor pivotally mounted in said inner gimbal about a third axis at right angles to the second, an air jet device for impelling the gyro-rotor, means defining an air duct supported by said housing and leading through the means supporting it for pivotal movement to said jet device, a plurality of jet nozzles supported on said housing, extending substantially tangentially thereof in opposite directions and constituting exhaust ports therefor, selective valve means to control flow through the jet nozzles in response to movement of the inner gimbal relative to the outer gimbal, whereby when a current of air is passed through said air jet device and said jet nozzles in series the gyro-rotor is caused to turn and the reaction of the jets from said jet nozzles applies a couple to the outer gimbal about the first axis to bring the inner gimbal to a predetermined position relative to the outer gimbal by precession of the gyro-rotor when the inner and outer gimbals are away from said predetermined position, and means for adjusting the jet nozzles axially.

2. A gyroscopic instrument as claimed in claim 1 in which the jet nozzles consist of an oppositely directed pair and the selective valve means consists of an arcuate baffle supported by the inner gimbal, said arcuate baffle being provided with a pair of overlapping arcuate slots each in a position to register with a corresponding jet nozzle and adapted, when the inner and outer gimbals lie in planes 90° apart, to permit equal flow through jets on both sides of said outer gimbal and to increase the flow through one jet nozzle while decreasing that through the other upon relative angular movement away from said 90° position, the direction of increased flow depending upon the direction of movement of the inner gimbal relative to the outer one.

3. A gyroscopic instrument as claimed in claim 1 further comprising a main housing surrounding the housing which constitutes the outer gimbal, said main housing supporting the means for supporting said outer gimbal for pivotal movement, an air duct in said main housing leading to said first mentioned duct, means defining an air exhaust passageway for said main housing, and a plurality of by-pass air apertures in the housing constituting the outer gimbal, said apertures being on axes parallel to said first axis so as not to interfere with the action of said jet nozzles.

4. A gyroscopic instrument comprising, a housing functioning as an outer gimbal, means supporting said outer gimbal for pivoted movement about a first axis, an inner gimbal pivotally carried by the outer gimbal about a second axis disposed at right angles to the first, said inner gimbal being located within said housing, a gyro-rotor mounted in said inner gimbal for rotation about a third axis at right angles to the second, an air jet device for said rotor, means defining an air duct supported by said housing and leading through the means supporting it for supplying air to said air jet device, a plurality of jet nozzles supported on said housing having portions extending substantially tangentially thereof in opposite directions and constituting exhaust ports therefor, selective valve means lying adjacent the inlet ends of said jet nozzles and adapted to control flow through the jet nozzles by selectively masking the inlet ends thereof in response to movement of the inner gimbal relative to the outer gimbal, whereby when a current of air is passed through said air jet device and said jet nozzles in series, the gyro-rotor is caused to turn and the reaction of the jets from said jet nozzles applies a couple to the outer gimbal about the first axis to bring the gimbal to a predetermined position relative to the outer gimbal by precession of the gyro-rotor when said inner and outer gimbals are away from said position, and means movably mounting said jet nozzles in said housing for adjustment of the inlet ends towards and away from said valve means.

5. The combination claimed in claim 4, and means operable from the exterior of said housing for adjusting the jet nozzles.

6. The combination claimed in claim 4, the jet nozzles being movably mounted for individual adjustment.

7. The combination claimed in claim 4, said jet nozzles comprising sleeves, the bores of which form the nozzles, the means movably mounting the jet nozzles comprising external threads on the sleeves engaging internally threaded passages through the housing.

8. The combination claimed in claim 4, said jet nozzles comprising sleeves, the bores of which form the nozzles, the means movably mounting the jet nozzles comprising external threads on the sleeves engaging two coaxial internally threaded passages through the housing.

9. A gyroscopic instrument comprising, a housing functioning as an outer gimbal, means supporting said outer gimbal for pivotal movement about a first axis, an inner gimbal pivotally carried by the outer gimbal about a second axis disposed at right angles to the first, said inner gimbal being located within said housing, a gyro-rotor pivotally mounted in said inner gimbal about a third axis at right angles to the second, an air jet device for impelling the gyro-rotor, means defining an air duct supported by said housing and leading through the means supporting it for pivotal movement to said jet device, a plurality of jet nozzles supported on said housing, extending substantially tangentially thereof in opposite directions and constituting exhaust ports therefor, and selective valve means to control flow through the jet nozzles in response to movement of the inner gimbal relative to the outer gimbal, whereby when a current of air is passed through said air jet device and said jet nozzles in series the gyro-rotor is caused to turn and the reaction of the jets from said jet nozzles applies a couple to the outer gimbal about the first axis to bring the inner gimbal to a predetermined position relative to the outer gimbal by precession of the gyro-rotor when the inner and outer gimbals are away from said predetermined position, said jet nozzles consisting of an oppositely directed pair and the selective valve means consisting of an arcuate baffle supported by the inner gimbal, said arcuate baffle being provided with a pair of overlapping arcuate slots each in a position to register with a corresponding jet nozzle and adapted, when the inner and outer gimbals lie in planes 90° apart, to permit equal flow through jets on both sides of said outer gimbal and to increase the flow through one jet nozzle while decreasing that through the other upon relative angular movement away from said 90° position, the direction of increased flow depending upon the direction of movement of the inner gimbal relative to the outer one.

DAVID CREW.